US009332486B2

(12) United States Patent
Scherzer

(10) Patent No.: US 9,332,486 B2
(45) Date of Patent: *May 3, 2016

(54) METHOD AND SYSTEM FOR SELECTING A WIRELESS NETWORK

(71) Applicant: WeFi Inc., Marlborough, MA (US)

(72) Inventor: Shimon Scherzer, Korazim (IL)

(73) Assignee: WeFi, INC., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,228

(22) Filed: Dec. 24, 2013

(65) Prior Publication Data

US 2014/0106748 A1    Apr. 17, 2014

Related U.S. Application Data

(63) Continuation of application No. 13/400,056, filed on Feb. 18, 2012, now Pat. No. 8,644,828, which is a continuation-in-part of application No. 12/180,159, filed on Jul. 25, 2008, now Pat. No. 8,126,476, said (Continued)

(51) Int. Cl.
| | |
|---|---|
| H04W 4/00 | (2009.01) |
| H04W 48/16 | (2009.01) |
| H04W 48/18 | (2009.01) |
| H04W 48/20 | (2009.01) |
| H04W 72/04 | (2009.01) |
| H04W 64/00 | (2009.01) |
| H04W 76/02 | (2009.01) |

(52) U.S. Cl.
CPC ............ *H04W 48/16* (2013.01); *H04W 48/18* (2013.01); *H04W 48/20* (2013.01); *H04W 72/0406* (2013.01); *H04W 64/00* (2013.01); *H04W 76/02* (2013.01)

(58) Field of Classification Search
CPC ..... H04W 48/16; H04W 48/18; H04W 48/20; H04W 64/00; H04W 72/0406; H04W 72/02
USPC ............ 455/418, 422.1, 432.1, 432.3, 435.2, 455/435.3, 440, 452.2
See application file for complete search history.

(56) References Cited

U.S. PATENT DOCUMENTS

| | | |
|---|---|---|
| 7,054,627 B1 | 5/2006 | Hillman |
| 7,103,661 B2 | 9/2006 | Klein |

(Continued)

*Primary Examiner* — Jean Gelin
(74) *Attorney, Agent, or Firm* — Finnegan, Henderson, Farabow, Garrett & Dunner, L.L.P.

(57) ABSTRACT

A method and system for selecting alternative wireless networks to establish a connection to, based on pattern information concerning determined relationships between the wireless user and the wireless network location. By monitoring location information and available wireless networks with range of a wireless user terminal, patterns of frequent and recurring locations and available wireless access points can be used to identify the wireless access points for alternative wireless networks that provide the best opportunity for off-loading. Because people tend to be creatures of habit and frequently return to certain locations during their daily lives, such as their home and their place of employ, as well as the homes of relatives and friends and other favorite places like restaurants, coffee shops, shopping and sporting venues. Assumptions can be derived by monitoring available wireless networks to identify those wireless networks that provide a beneficial opportunity to offload primary (e.g., cellular) network services onto other local networks.

17 Claims, 2 Drawing Sheets

Related U.S. Application Data application No. 12/180,159 is a continuation-in-part of application No. 11/743,853, filed on May 3, 2007, now Pat. No. 8,000,276.

(60) Provisional application No. 61/444,706, filed on Feb. 19, 2011, provisional application No. 60/888,291, filed on Feb. 5, 2007.

(56) References Cited

U.S. PATENT DOCUMENTS

| | | | |
|---|---|---|---|
| 7,181,220 B2 | 2/2007 | Tsui | |
| 7,236,798 B2 | 6/2007 | Beuck | |
| 7,266,595 B1 | 9/2007 | Black et al. | |
| 7,315,750 B2 | 1/2008 | Chou et al. | |
| 7,323,991 B1 | 1/2008 | Eckert et al. | |
| 7,483,984 B1 | 1/2009 | Jonker et al. | |
| 7,613,427 B2 | 11/2009 | Blight et al. | |
| 7,697,932 B2 | 4/2010 | Nakajima | |
| 7,940,731 B2 | 5/2011 | Gao et al. | |
| 2003/0105835 A1* | 6/2003 | Hori et al. | 709/219 |
| 2004/0066759 A1 | 4/2004 | Molteni et al. | |
| 2004/0110530 A1* | 6/2004 | Alone et al. | 455/552.1 |
| 2004/0198220 A1* | 10/2004 | Whelan | H04W 12/06 455/41.1 |
| 2005/0048972 A1* | 3/2005 | Dorenbosch | H04W 36/32 455/436 |
| 2005/0070279 A1 | 3/2005 | Ginzburg et al. | |
| 2005/0090259 A1* | 4/2005 | Jain et al. | 455/439 |
| 2005/0232189 A1 | 10/2005 | Loushine | |
| 2006/0019663 A1* | 1/2006 | Cuffaro et al. | 455/436 |
| 2006/0095348 A1 | 5/2006 | Jones et al. | |
| 2006/0095349 A1 | 5/2006 | Morgan et al. | |
| 2006/0142004 A1* | 6/2006 | He et al. | 455/434 |
| 2006/0143098 A1 | 6/2006 | Lazaridis | |
| 2006/0168438 A1 | 7/2006 | Klein | |
| 2006/0171348 A1 | 8/2006 | Nokano | |
| 2006/0171388 A1 | 8/2006 | Ikeda | |
| 2006/0217131 A1 | 9/2006 | Alizadeh-Shabdiz et al. | |
| 2006/0239230 A1* | 10/2006 | Nakano | 370/331 |
| 2007/0004427 A1 | 1/2007 | Morgan et al. | |
| 2007/0004428 A1 | 1/2007 | Morgan et al. | |
| 2007/0010248 A1 | 1/2007 | Dravida et al. | |
| 2007/0019670 A1 | 1/2007 | Falardeau | |
| 2007/0066304 A1 | 3/2007 | Lee | |
| 2007/0067807 A1* | 3/2007 | O'Neil | H04N 7/17318 725/62 |
| 2007/0076671 A1* | 4/2007 | Winget et al. | 370/338 |
| 2007/0079376 A1 | 4/2007 | Robert et al. | |
| 2007/0083470 A1 | 4/2007 | Bonner et al. | |
| 2007/0088951 A1 | 4/2007 | Nakajima | |
| 2007/0121560 A1 | 5/2007 | Edge | |
| 2007/0171881 A1 | 7/2007 | Zhang et al. | |
| 2007/0184845 A1 | 8/2007 | Troncoso | |
| 2007/0232322 A1 | 10/2007 | Jagadeesan et al. | |
| 2007/0275701 A1 | 11/2007 | Jonker | |
| 2008/0013487 A1 | 1/2008 | Molteni et al. | |
| 2008/0069065 A1* | 3/2008 | Wu et al. | 370/340 |
| 2010/0296441 A1 | 11/2010 | Barkan | |
| 2011/0035420 A1 | 2/2011 | Alizadeh-Shabdiz et al. | |
| 2011/0143756 A1 | 6/2011 | Gallagher et al. | |

* cited by examiner

METHOD AND SYSTEM FOR SELECTING A WIRELESS NETWORK

CROSS-REFERENCE TO RELATED APPLICATIONS

This application is a continuation of and claims priority from U.S. patent application Ser. No. 13/400,056, filed Feb. 18, 2012. U.S. patent application Ser. No. 13/400,056 is a continuation-in-part of and claims priority from U.S. patent application Ser. No. 12/180,159, filed Jul. 25, 2008, and claims priority from U.S. Provisional Application No. 61/444,706, filed Feb. 19, 2011. U.S. patent application Ser. No. 12/180,159 is a continuation-in-part of and claims priority from U.S. patent application Ser. No. 11/743,853, filed May 3, 2007. U.S. patent application Ser. No. 11/743,853 claims priority from U.S. Provisional Application No. 60/888,291, filed Feb. 5, 2007. All of the above referenced patent applications and provisional applications are incorporated herein by reference.

BACKGROUND

1. Technical Field of the Invention

The present invention is directed to methods and systems in wireless user terminals, such as mobile smart phones, for detecting wireless networks and assisting users with the selection of wireless networks, such as WiFi hotspots. Specifically, this includes monitoring a user's activities and the available wireless network resources over time to identify those wireless network resources that can provide beneficial service to the user on a recurring basis and a random basis.

Using real-time information about available wireless networks and historical information including where users regularly and frequency spend time, as well as patterns of wireless network usage and availability, a list of one or more alternative wireless networks that can be used as an alternative to the cellular network can be developed. The list can be used to identify those networks which can provide some benefit to the user in their daily life as well enable the user's wireless carrier (or wireless network operator) to offload voice and data traffic to an alternative network.

2. Description of the Prior Art

Cellular networks generally consist of two main parts: the radio access subsystem and the core network. The rapid increase of data usage and resulting network congestion give rise to the need for integration of multiple radio access (wireless) technologies other than the traditional cellular radios (most notably—WLAN or WiFi). The industry is taking various steps to facilitate this by incorporating WLAN and other access techniques in mobile terminals and building internetworking solutions to allow session persistence while connecting an ongoing "call" between various access technologies etc.

WLAN (e.g., WiFi) has recently become the alternate network of choice for data offloading. However, due to some fundamental differences between traditional cellular technology and WLAN, incorporating WLAN into the mix of "legitimate" access technologies serving the mobile networks has few unique challenges. WLAN transmission power is severely limited in comparison to its cellular counterpart; consequently WLAN radio coverage is rather limited and normally would not go beyond few tens of meters. To provide acceptable WLAN coverage one must deploy much larger amount of WLAN access points then done in cellular deployment. Higher deployment density (larger number of deployment sites) results with higher maintenance cost thereby defeating the purpose of lowering service cost. Unlike cellular technology that operates in a "private" (licensed) spectrum, WLAN needs to function within hostile conditions of unlicensed spectrum; radio interference is uncontrolled in these spectrum bands. Consequently operators find it very difficult to assure an acceptable quality of service (QoS) putting in question the use of WLAN altogether.

The common WLAN solution offered to operators is basically replicating cellular operator's deployment. Companies are deploying WLAN access points at specific locations where they expected increase data traffic (hotels, airports, large stores etc.). This solution could be adequate when user terminals were mostly laptops that are not very mobile. The deployed networks are managed using traditional network/cellular management techniques. As mentioned above, providing highly ubiquitous WLAN coverage using this approach is not practical due to maintenance cost considerations.

As time progresses, much higher mobility devices are becoming common; smart-phones such as iPhone and Android devices are rapidly becoming main data traffic contributors hence the selected locations model is quickly becoming obsolete. The need for ubiquitous WLAN coverage is growing further challenging the operator's style deployment.

The industry, through its standardization process, has been defining a new core network function to support heterogeneous wireless access environment: the Access Network Discovery and Selection Function (ANDSF). The ANDSF is aimed to guide mobile terminals in finding alternate access networks and select the most suitable network for best service. Currently, the ANDSF is designed to support locating "carrier WLAN" and selecting the access network based on administrative policies. For example—connect to WLAN if there is a roaming agreement with the WLAN owner. No mechanism has been defined to dynamically improve the effectiveness of these policies by testing their impact on service quality or performance. This shortcoming is especially critical when dealing with WLAN where operation environment is less predictable due to the issues mentioned above.

While the availability of an alternative wireless network can be determined, in many instances, access to the wireless network is controlled through the use of encryption, access password and captive portals. This means that user must ask for permission to access and use the network.

SUMMARY

Wireless network users typically are configured to automatically connect to a user's primary wireless network. For example, mobile smart phones connect to the user's cellular carrier network which serves as the primary wireless network for voice and data services. In many situations, other wireless networks, sometimes networks with higher bandwidth and user capacity are available to the wireless network user. The present invention is directed to methods and systems for discovering these other wireless networks and assisting users to connect to those wireless networks, for example, in order offload wireless services from the primary (e.g. cellular) wireless network. In accordance with some embodiments of the invention, a software application or program (e.g., a client application) on the user's wireless device can detect the other available wireless networks and make recommendations to the user, encouraging the user to connect to the detected wireless networks. Where the wireless network requires a password or other credentials to access, the application can encourage the user to ask for the password to access the network. In some embodiments of the invention, the software application can connect with other wireless terminals or a central server that can provide the wireless device with information about other available wireless networks as well as provide access passwords or other credentials.

In accordance with some embodiments of the invention, the software application can monitor the location and/or the time of day usage patterns of the wireless user and combine that information with information about other available wireless networks and then analyze the information to identify patterns of usage that can be associated with available wireless networks. The wireless networks that become available regularly or frequently around the same time of day or at the same location in a period of time (e.g., 1 day, 5 days, 7 days, 14 day, etc.) of the user's monitored usage patterns can be assigned a higher priority because the wireless networks that are available during these times or at these locations can provide a greater opportunity for providing a better wireless connection, for example, by switching from the user's primary (e.g., cellular) wireless communications network to one of the alternative wireless networks. The software program can notify the user of the availability of these alternative wireless networks and encourage the user to connect to these wireless networks (including seeking appropriate credentials to obtain access). In some embodiments of the invention, the software application can connect with other wireless terminals or a central server that can provide the wireless device with information about other available wireless networks as well as provide access passwords or other credentials.

In accordance with some embodiments of the invention, the software application can also monitor the user's primary network usage in addition to, the time of day and/or location information while detecting the other available wireless networks and then analyze the usage, the location and time of day information in order to identify patterns of usage that can be associated with other available wireless networks. The where the user's wireless network usage is high (or higher than a defined threshold), the wireless networks that become available regularly or frequently around the same time of day or at the same location in a period of time (e.g., 1 day, 5 days, 7 days, 14 day, etc.) can be assigned a higher priority because the wireless networks that are available during these times or at these locations can provide a greater opportunity for providing a better wireless connection, for example, by switching from the user's primary (e.g., cellular) wireless communications network to one of the alternative networks. The software program can notify the user of the availability of these alternative networks and encourage the user to connect to these wireless networks (including seeking appropriate credentials to obtain access). In some embodiments of the invention, the software application can connect with other wireless terminals or a central server that can provide the wireless device with information about other available wireless networks as well as provide access passwords or other credentials.

In accordance with some embodiments of the invention, some or all of the information collected can be forwarded to a server on a network and stored in a database. A software application or program can analyze the information stored in the database and send communications to end user wireless devices. The communications can include a list of alternative wireless networks that, based on the information received by the server, provide some benefit for the end user and/or the user's primary (e.g. cellular) wireless carrier by offloading communications to the alternative wireless network.

In accordance with some embodiments of the invention, the wireless user terminal can also communicate with other wireless user terminals to obtain information about available wireless networks at a given location (e.g., the wireless user terminals current location or a future location). A software application or program on wireless user terminal can analyze the information collected from other wireless user terminals about available wireless network and create an ordered list of available wireless networks that, based on the information received, can provide a wireless network connection and in some cases provide some benefit for the end user and/or the user's primary (e.g. cellular) wireless carrier, for example, by offloading the primary carrier communications load of that wireless terminal to an alternative wireless network.

In accordance with some embodiments of the invention, where more than one other network is available at a location, additional information about each of the wireless networks can be collected by the software application on the user terminal in order to decide which wireless network to connect to. This information can include real-time performance information as well as historical performance information that can be used to select the best network at the time of connection. See, for example, the method and system disclosed in commonly owned U.S. patent application Ser. No. 13/362,554, entitled Dynamic Network Connection System and Method, the entire contents of which are hereby incorporated by reference.

In accordance with some embodiments of the invention, the software application or program, can store the alternative wireless network information as well as any need network access credentials (e.g., WPA passwords or captive portal login information) and automatically connect the user wireless terminal to the alternative wireless network at a specified time of day, when the user wireless terminal arrives in a known location or detects the alternative wireless network. The software application (e.g., the client application) can also transfer some of this information to a network server that can store this information in a network database and make the information available to other wireless user terminals as described in U.S. Pat. No. 8,000,276.

DETAILED DESCRIPTION

Figure 1:
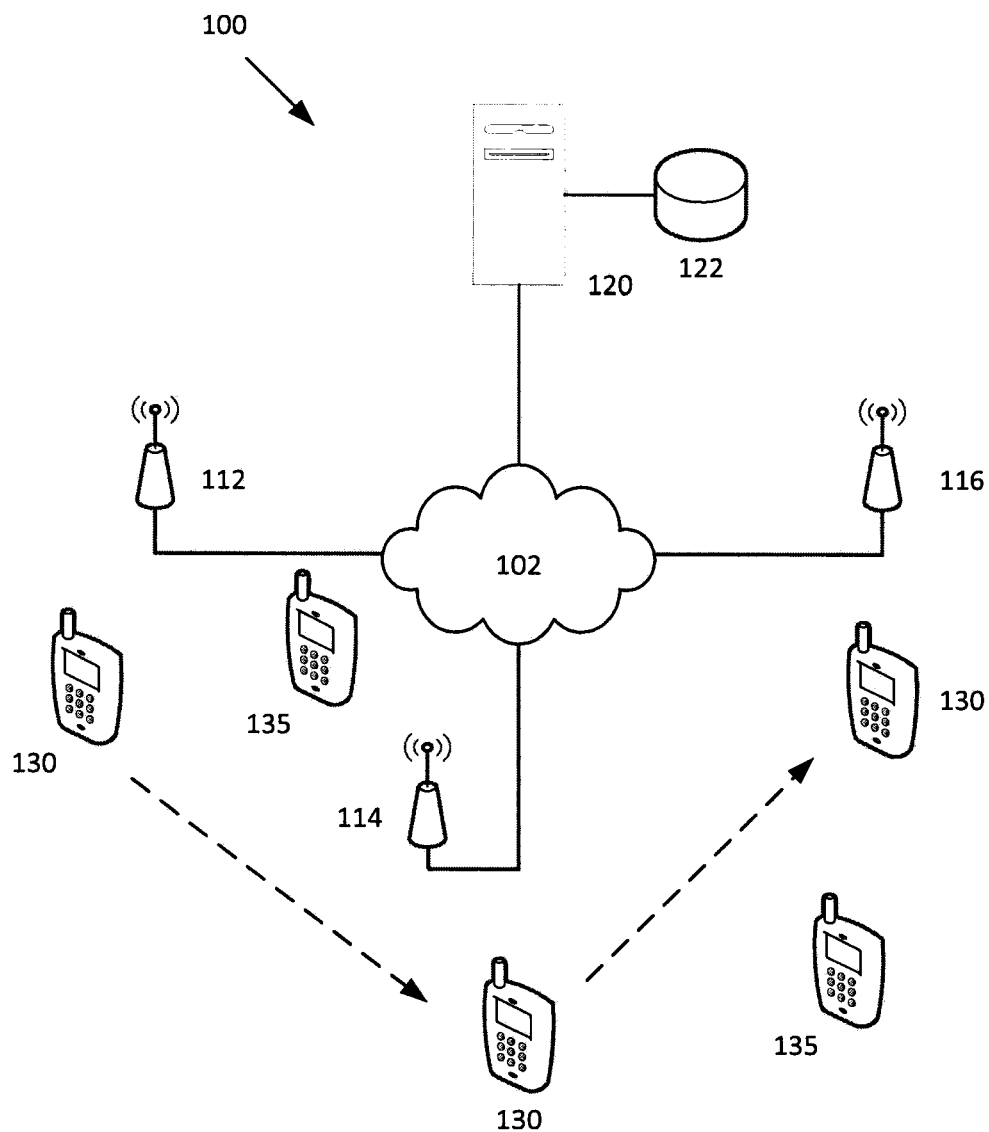
FIG. 1 is a diagrammatic view of a system according to the invention.

Wireless user terminals, for example, for example smart phones, are generally configured to automatically connect to the user's primary wireless network (e.g., the cellular carrier network) which serves as the primary wireless network for voice and data services. In many situations, other wireless networks (e.g., WiFi, WiMAX), sometimes with higher bandwidth and user capacity are available to the wireless network user. The present invention is directed to methods and systems for identifying these alternative wireless networks and assisting or encouraging users to access or switch to those wireless networks. This can benefit the wireless user because the user can obtain access to a faster and potentially more reliable wireless network. This can also benefit the user's wireless carrier because the carrier can offload voice and/or data network traffic on to another network.

The present invention leverages the likelihood that many wireless users spend a significant portion of their time on a regular basis in a small set of locations according to fairly regular or consistent routine. Users are likely to spend a significant portion of the in their homes or at their place of employment or at a school as well as friend's homes and favorite places (e.g., restaurants and coffee shops). In addition, the user is likely to be at these locations on regular times of day and/or for repeatable time intervals and the user's need for access to wireless services is likely to be predictable during these times. In many situations, these places are likely to provide alternative wireless network access to the internet and provide an opportunity to connect to these alternative wireless networks, for example, in order to transfer or offload some or all of the wireless user terminal network traffic on to these alternative wireless networks.

Using location data and other data available in wireless user terminals (e.g., smart phone devices) and the ability to detect wireless network access points (e.g., WiFi hotspots) a software application can be used to determine the nature of the detected wireless network access points. In addition, using other information available to the wireless user terminal, such as a user's location patterns (e.g., location information according to time of day or day of the week), Internet usage data and other data, a software application can associate or define relationships between a user and a location (or hotspot). For example, if the software application detects a user's presence in proximity of a hotspot during the night time multiple times, there is a likelihood that this wireless network access points is located at the wireless user's residence. For example, wireless network access points within range of the wireless user terminal during working hours (e.g., 9 am to 5 pm) can be associated with a workplace and wireless network access points within range of the wireless user terminal between the hours of 12 pm and 2 pm and/or 5 pm and 8 pm can be restaurants (provided they are different from the user's home wireless network access point). The software application can monitor the number of hours that a particular wireless network access point is within range of the wireless user terminal as well as the time(s) of day that the access point is within range. Where the number of hours or the number times that a wireless network access point is within range of the wireless user terminal, over a predefined period of time is above a predetermined threshold, certain attributes (e.g., home, work, restaurant, train station and airport) can be associated with a particular wireless network access point. In some embodiments, a wireless network database can be provided and information about wireless network access points that have been detected by other wireless user terminals can stored in that database with an attribute or indicator of a type network (e.g., home network, hotel network, corporate guest network, etc.) The software application can send a network identifier, such as an SSID or MAC address to the server to query the server for the attribute(s) or indicator(s), to assist the software application in determining the type of network. This can help to further define the types of available networks and avoid classification errors (e.g., night time network is hotel network, not a home network, etc.).

Another example can be a wireless network access point in a restaurant—if the wireless user terminal detects the user, in the evening hours, can connect to wireless network access point that was classified as a restaurant, an attribute or indicator can be used to indicate that the restaurant may be a favorite restaurant. Further, there is a high likelihood that if the user asks for the restaurant wireless network access point password, it will be provided to him, allowing him to access the Internet via that access point. Other associations can be made using known behavior patterns detecting wireless network access points within range, according to time of day and/or duration of access.

FIG. 1 shows a diagram of a system 100 according to one embodiment of the invention. System 100 can include a network 102 that includes one or more access points 112, 114, 116 and optionally one or more servers 120. The server 120 can include a database 124 or be connectable to a database to access and store user data and wireless network access point data in the database. During normal usage, the wireless user terminal 130 can move from a location adjacent a first wireless network access point 112 to a location adjacent a first wireless network access point 114, to a location adjacent a first wireless network access point 116. During specific periods of time, the wireless user terminal 130 or a software application being executed on the wireless user terminal 130 can discover and record information about wireless network access points within range 112, 114, 116.

Typically, each wireless user terminal 130 can include one or more computer processors or multi-core computer processors and associate member and be adapted and configured to execute software and programs including an operating system. The wireless user terminal 130 can further include one or more software modules that can enable the device to communicate data over one or more wireless networks and store data received from one or more wireless networks. In some embodiments of the invention, the wireless user terminal 130 can include GPS module that enables to the wireless user terminal 130 to receive communications from global positioning satellites and calculate its current location or transmit the information to another terminal to obtain current location information. Alternatively, the wireless user terminal 130 can include one or more components that enable it determine its location based on, for example, wireless network information (WiFi location services) or cellular network information.

In accordance with one embodiment of the invention, the software module or, for example, the client software module can be installed or otherwise loaded onto the wireless user terminal 130 and executed to perform one or more of the following:

Determining the wireless user terminal 130 location (e.g., based on GPS information, WiFi location services or cell-location services).

Determining the wireless user terminal 130 voice and/or data usage on the primary (e.g.,cellular) wireless network and any other available networks 112, 114, 116. This usage data can include the amount of data transferred, the time of transmission, the data speed, the length of usage periods, the applications in use on the wireless user terminal 130 and their associated data consumption. Determining the available wireless networks 112, 114, 116 (e.g., WiFi networks) in reach, their network names (e.gl, SSID), MAC addresses (BSSID), RSSI, Encryption status, External IP, and Monitor Battery status.

Reporting some or all of the above information to a central database 122 or a central data processing server 120. The data processing server 120 can receive and store the above data in a database 122. In addition, the data processing server120 can also determine the nature of the detected alternative wireless networks 112, 114, 116 based on the network name or identifier, external IP, and physical location. In some embodiments, the wireless user terminal 130 can report the above information to other available wireless terminals 135, for example, in peer-to-peer fashion and similarly, the wireless user terminal 130 can also receive this information about available wireless networks from other wireless user terminals 135.

Determining the type of wireless network access and any relationship to the user to the wireless access point, based on: 1) time of being in its proximity, 2) frequency of being in its proximity, 3) data consumption patterns and 4) physical location. The server can determine that the wireless user has some relationship with a location associated with a wireless network access point and for example, assign a relationship attribute or indicator to the wireless network access point. Alternatively, the software module or another software module can determine that the wireless user has some relationship with a location associated with a wireless network access point and for example, assign a relationship attribute or indicator to the wireless network access point and for example, assign a relationship attribute or indicator to the wireless network access point.

Once the server 120 (or the software module) determines that the wireless user terminal 130 is in close proximity to one of the wireless network access points 112, 114, 116 and that the user may have a relationship with, the server 120 can, for example, send a message to the wireless user terminal 130 and the wireless user terminal 130 can present a message to the user suggesting that the user ask for the password (or other access credentials) and use WiFi instead of cellular connection. In accordance with some embodiments, the offloading on to WiFi can be initiated in return for some service discount from the carrier.

In addition, either the server 120 or the client application 130 can, ask the wireless user about the attributes of a wireless network access point, such as a home/residence access point, a business private or guest access point, a commercial access point (e.g., fee for access) and this information can be stored in a central database to enable subsequent devices to determine an access point type by comparing the name or other identifier with corresponding information in the database. Using this information, the access points can be categorized and relationships determined.

Figure 2:
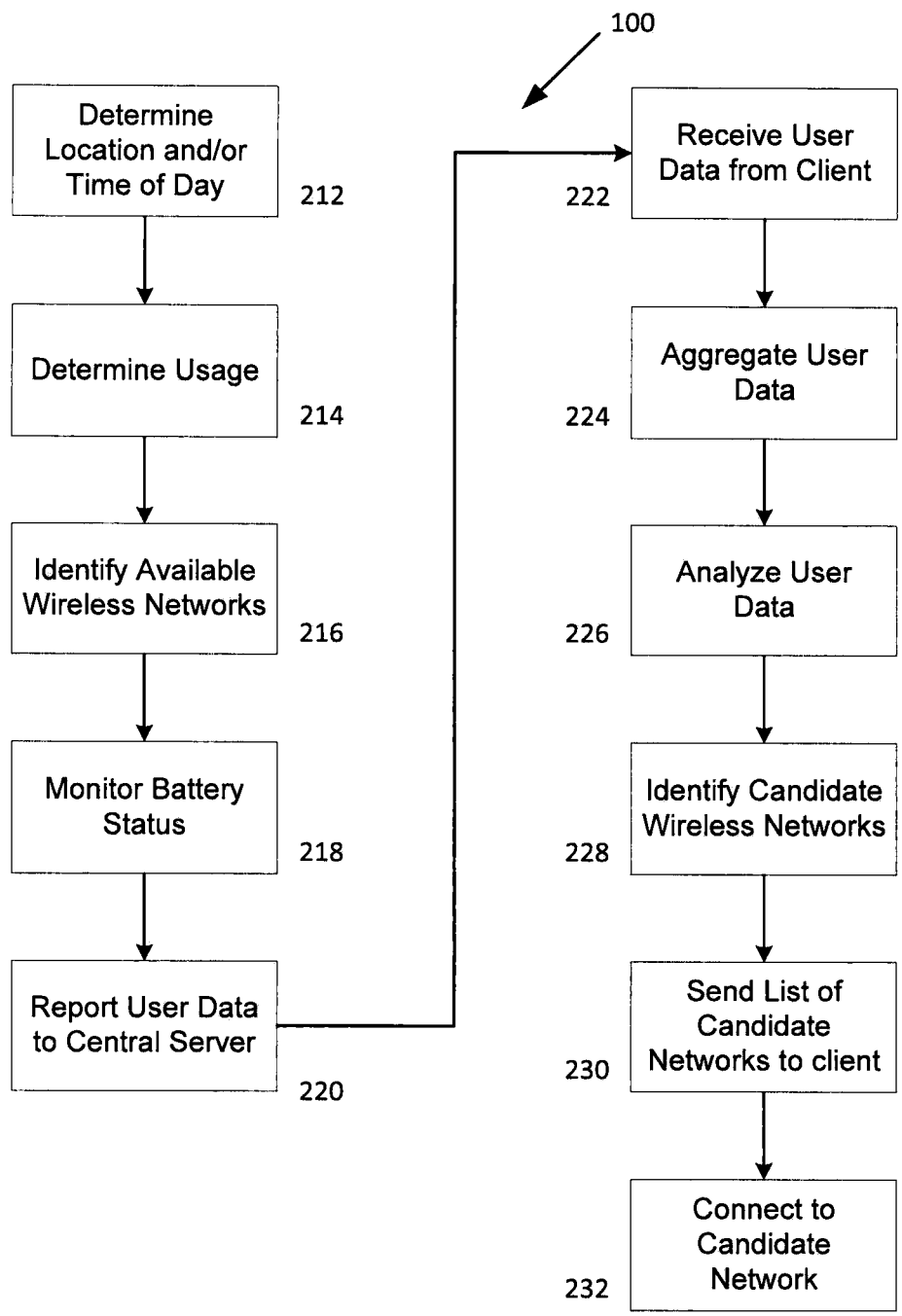
FIG. 2 is a diagrammatic view of a method according to the invention.

FIG. 2 shows a method 200 for defining a relationship between a wireless user terminal and an alternative wireless network. The method can include determining the location of the wireless user terminal, 212, optionally determining the data usage of the wireless user terminal, 214 and identifying the location of available wireless networks, 216. Optionally, the status of the battery can be determined, 218. At least some of the location information as well as at least some of the usage and available wireless network information can be sent to a software module, either in the wireless user terminal or at a remote server, 220. At the server, the information can be received and stored on the server, 222. Where other data relating to the wireless user terminal is already stored on the server, optionally, the new information can be combined with existing data, 224, for example, by summing or averaging the data. The data can be analyzed by the software module, 226, in order to identify one or more candidate wireless network to connect to, 228. A list of one or more candidate networks can be provided to the wireless user terminal 230 and the wireless user terminal can, either automatically or under user control, use the list of candidate networks to select and attempt to connect to one of the candidate wireless networks, 232. For example, the software module can automatically select the candidate network with the highest bandwidth and/or the lowest error rate.

In an alternative embodiment, instead of reporting user data to a central server, at 220, the wireless user terminal can store the user data in memory and where other data relating to wireless user terminal is already stored in memory, the new user data can be combined with the existing stored user data, 224, for example, by summing or averaging the data. The data can be analyzed by a software module in the wireless user terminal, 226, in order to identify one or more candidate wireless network to connect to, 228. A list of one or more candidate networks can be provided to the user of the wireless user terminal 230 and the wireless user terminal can, either automatically or under user control, use the list of candidate networks to select and attempt to connect to one of the candidate wireless networks, 232. For example, the software module can automatically select the candidate network with the highest bandwidth and/or the lowest error rate.

Where the access point is a residential access point, the relationship with wireless user can be, for example, either the residential owner/operator or a guest of the residential owner/operator. Where the access point is a business access point the user can be considered an employee or where the access point is a business guest access point, the user can be considered guest or visitor. Where the access point is at a restaurant or coffee shop, the relationship can be monitored to see if it is frequented location, and thereby a favorite place or merely a one-time visited location.

The decision to contact the user (e.g. the wireless customer) to promote WiFi usage can be done carefully to avoid annoying or offending the wireless user that could render the system and method ineffective. In accordance with one embodiment, a relationship metric can be determined and the value of the relationship metric compared with a threshold. The relationship metric can be determined as function of the number of times the wireless user terminal visits a give given location in a given time period, for example, the total number of times in a day, week or month. Alternatively, the relationship metric can be determined as a function of the total number communications to a given location (e.g., email, text, and phone calls), for example, sum total of all communication to a given location. When the relationship metric exceeds the threshold or other predefined level, the user can be contacted, such as by an email or pop-up message. Other parameters can also be considered as part of the metric. For example, the user contact may not be needed if carrier network is not very loaded.

In accordance with one embodiment of the invention, the system can leverage the operator's billing notices. The billing system can track the situations where the wireless user stayed on the cellular network for service while the wireless user terminal could have connected to alternative wireless network (e.g., an available WiFi network) for that service. The billing system can generate a report that calculates the potential savings in customer bill, had the user offloaded some or all the network traffic onto the alternative network and attach to the billing notices.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than on invention.

The invention claimed is:
1. A method, comprising:
  receiving data associated with a plurality of detections of a wireless network access point in proximity to a wireless user terminal;
  periodically collecting location information about the wireless user terminal over a period of time;
  determining at least one of a time-related pattern or a data consumption pattern associated with the plurality of detections using the location information;

determining a type of wireless network based on the determined pattern; and outputting, based on the determined type of wireless network and a given location of the wireless user terminal, data presenting the wireless network access point as a candidate wireless network for connection.

2. The method of claim 1, further comprising:
attempting to connect the wireless network access point to the wireless user terminal based on the output data.

3. The method of claim 1, further comprising:
receiving data about the wireless network access point from a remote server.

4. The method of claim 1, further comprising:
receiving data about the wireless network access point from one or more remote wireless user terminals.

5. The method of claim 1, further comprising:
reporting information about the wireless network access point and time of day information to a network server.

6. The method of claim 1, further comprising:
selecting the candidate wireless network for connection based on bandwidth and/or error rate.

7. The method of claim 1, wherein the determination of the time-related pattern includes a determination that a time of day of each of the plurality of detections is within a particular range of times of day.

8. The method of claim 7, wherein the type of wireless network is a home network, if the time of day of each of the plurality of detections is within a first range of times, and a workplace network, if the time of day of each of the plurality of detections occurred within a second range of times.

9. A server comprising:
at least one processor; and
at least one memory device including instructions that, when executed by the at least one processor, configure the at least one processor to:
receive data associated with a plurality of detections of a wireless network access point in proximity to a wireless user terminal;
periodically collect location information about the wireless user terminal over a period of time;
determine at least one of a time-related pattern or a data consumption pattern associated with the plurality of detections using the location information;
determine a type of wireless network based on the determined pattern; and
output, based on the determined type of wireless network and a given location of the wireless user terminal, data presenting the wireless network access point as a candidate wireless network for connection.

10. The server of claim 9, wherein the instructions, when executed by the at least one processor, further configure the at least one processor to:
select the candidate wireless network for connection based on bandwidth and/or error rate.

11. The server of claim 9, wherein the determination of the time-related pattern includes a determination that a time of day of each of the plurality of detections is within a particular range of times of day.

12. The server of claim 11, wherein the type of wireless network is a home network, if the time of day of each of the plurality of detections is within a first range of times of day, and a workplace network, if the time of day of each of the plurality of detections occurred within a second range of times of day.

13. A wireless user terminal, comprising:
at least one processor; and
at least one memory device including instructions that, when executed by the at least one processor, configure the at least one processor to:
detect a wireless network access point a plurality of times;
output data associated with the plurality of detections and a given location of the wireless user terminal to a server; and
receive data presenting the wireless network access point as a candidate wireless network for connection based on at least one of a time-related pattern or a data consumption pattern associated with the plurality of detections;
wherein the at least one of the time-related pattern or the data consumption pattern is determined based on location information about the wireless user terminal that was periodically collected over a period of time.

14. The wireless user terminal of claim 13, wherein the instructions, when executed by the at least one processor, further configure the at least one processor to:
receive information about the wireless network access point from at least one other wireless user terminal.

15. The wireless user terminal of claim 13, wherein the candidate wireless network is selected based on bandwidth and/or error rate.

16. The wireless user terminal of claim 13, wherein the received data includes a type of wireless network determined based on a determination that a time of day of each of the plurality of detections is within a particular range of times of day.

17. The wireless user terminal of claim 16, wherein the type of wireless network is a home network, if the time of day of each of the plurality of detections is within a first range of times of day, and a workplace network, if the time of day of each of the plurality of detections occurred within a second range of times of day.

* * * * *